United States Patent
Song et al.

(10) Patent No.: US 12,535,913 B2
(45) Date of Patent: Jan. 27, 2026

(54) TOUCH SIGNAL DETECTION APPARATUS FOR CALIBRATING QUANTIZATION ERROR OF TOUCH SIGNAL

(71) Applicant: G2touch Co., Ltd., Seongnam-si (KR)

(72) Inventors: Hyuk-Jae Song, Seongnam-si (KR); Hwa-Joo Noh, Seongnam-si (KR)

(73) Assignee: G2touch Co., Ltd., Seongnam-si (KR)

( * ) Notice: Subject to any disclaimer, the term of this patent is extended or adjusted under 35 U.S.C. 154(b) by 0 days.

(21) Appl. No.: 19/064,709

(22) Filed: Feb. 27, 2025

(65) Prior Publication Data

US 2025/0383736 A1     Dec. 18, 2025

(30) Foreign Application Priority Data

Jun. 14, 2024   (KR) .......................... 10-2024-0077324

(51) Int. Cl.
   *G06F 3/041*           (2006.01)

(52) U.S. Cl.
   CPC ................................ *G06F 3/0418* (2013.01)

(58) Field of Classification Search
   CPC ........................................................ G06F 3/041
   USPC .................................................. 345/173–174
   See application file for complete search history.

(56) References Cited

U.S. PATENT DOCUMENTS

| 2015/0138145 | A1* | 5/2015 | Hwang | G06F 3/04166 |
| --- | --- | --- | --- | --- |
| | | | | 345/174 |
| 2017/0024061 | A1* | 1/2017 | Forlines | G06F 3/0446 |
| 2020/0371612 | A1* | 11/2020 | Forlines | G06F 3/0446 |

FOREIGN PATENT DOCUMENTS

| CN | 111831144 | A | * | 10/2020 | ........... G06F 3/0418 |
| --- | --- | --- | --- | --- | --- |
| JP | 2021096409 | A | | 6/2021 | |
| KR | 20180062563 | A | | 6/2018 | |
| KR | 20200134091 | A | | 12/2020 | |
| TW | 201351879 | A | * | 12/2013 | ........... G06F 3/0418 |

* cited by examiner

*Primary Examiner* — Kwin Xie
(74) *Attorney, Agent, or Firm* — NKL Law; Jae Youn Kim (57) ABSTRACT

Provided is touch signal detection apparatus configured to calibrate an error of a touch signal, the touch signal detection apparatus including a first digital-to-analog converter (DAC) configured to provide a first calibration voltage, a second DAC configured to provide a second calibration voltage, an attenuator configured to attenuate the second calibration voltage and provide the attenuated calibration voltage, an adder configured to add the first calibration voltage and the attenuated calibration voltage, a calibration amplifier configured to amplify a difference between a touch signal generated by detecting touch input and output of the adder with gain greater than 1 and output the difference, a sample-hold unit configured to sample and hold output of the calibration amplifier, and an analog-to-digital converter (ADC) configured to convert output of the sample-hold unit into a digital code.

12 Claims, 9 Drawing Sheets

FIG. 1

-PRIOR ART-

TOUCH SIGNAL DETECTION APPARATUS FOR CALIBRATING QUANTIZATION ERROR OF TOUCH SIGNAL

BACKGROUND OF THE INVENTION

Field of the Invention

The present invention relates to a touch signal detection apparatus, and more particularly to an error calibration technology of the touch signal detection apparatus that detects a touch signal with high gain.

Description of the Related Art

Figure 1:
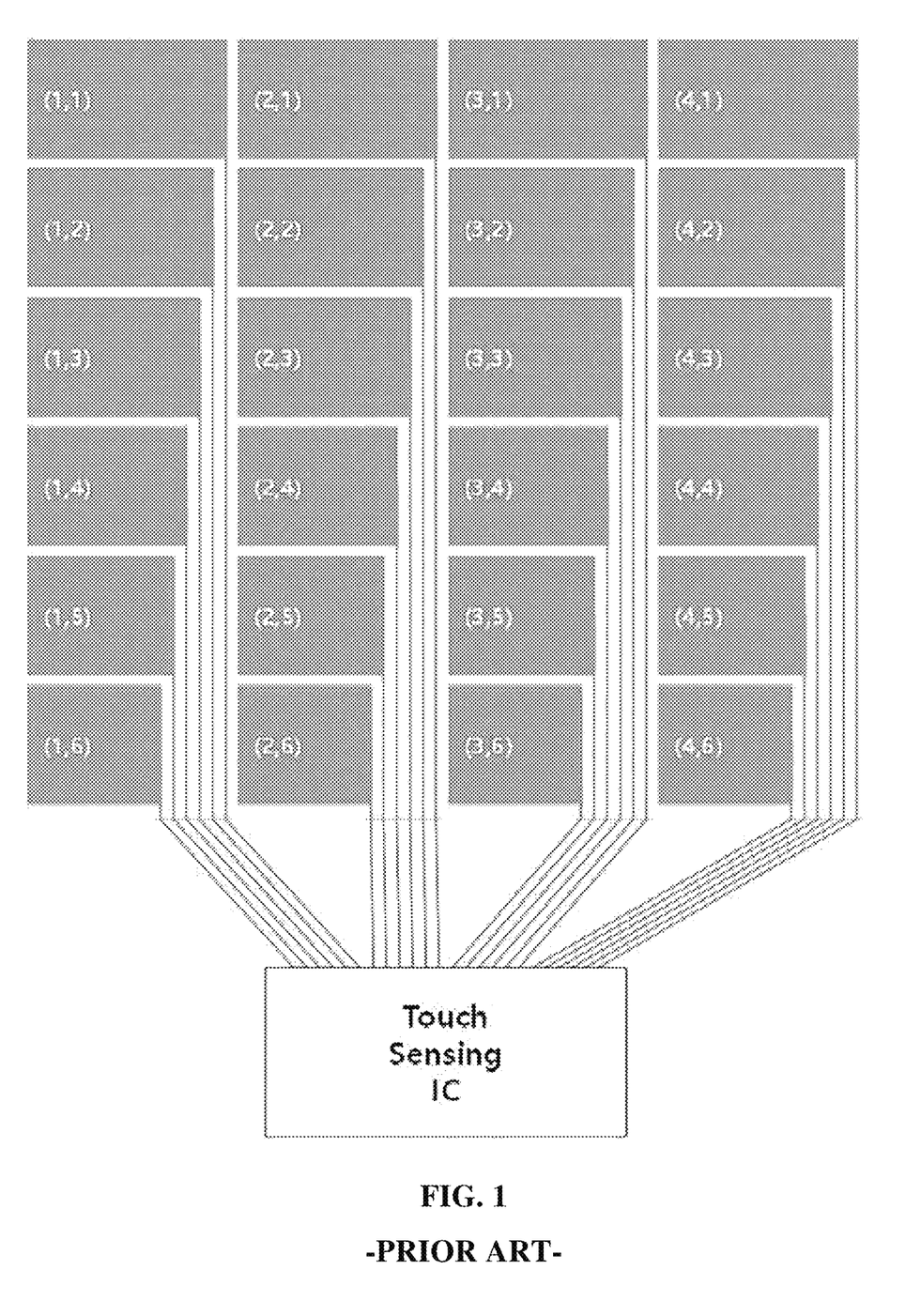
FIG. 1 is a diagram schematically illustrating a touch panel that detects touch input of a user and outputs a corresponding touch signal.

FIG. 1 is a diagram schematically illustrating a touch panel that detects touch input of a user and outputs a corresponding touch signal. As illustrated in FIG. 1, when the user touches the touch panel using an object such as a finger, a capacitor having capacitance is formed between the object and a sensor forming the touch panel, and the capacitance is detected to determine whether touch has occurred.

As illustrated in the figure, even for sensors arranged in the same column, signal deviation occurs due to differences in lengths of wires connecting a touch detection circuit (touch sensing IC) that detects touch and the sensors, and even for sensors arranged in the same row, deviation occurs due to differences in lengths of wires.

Figure 2:
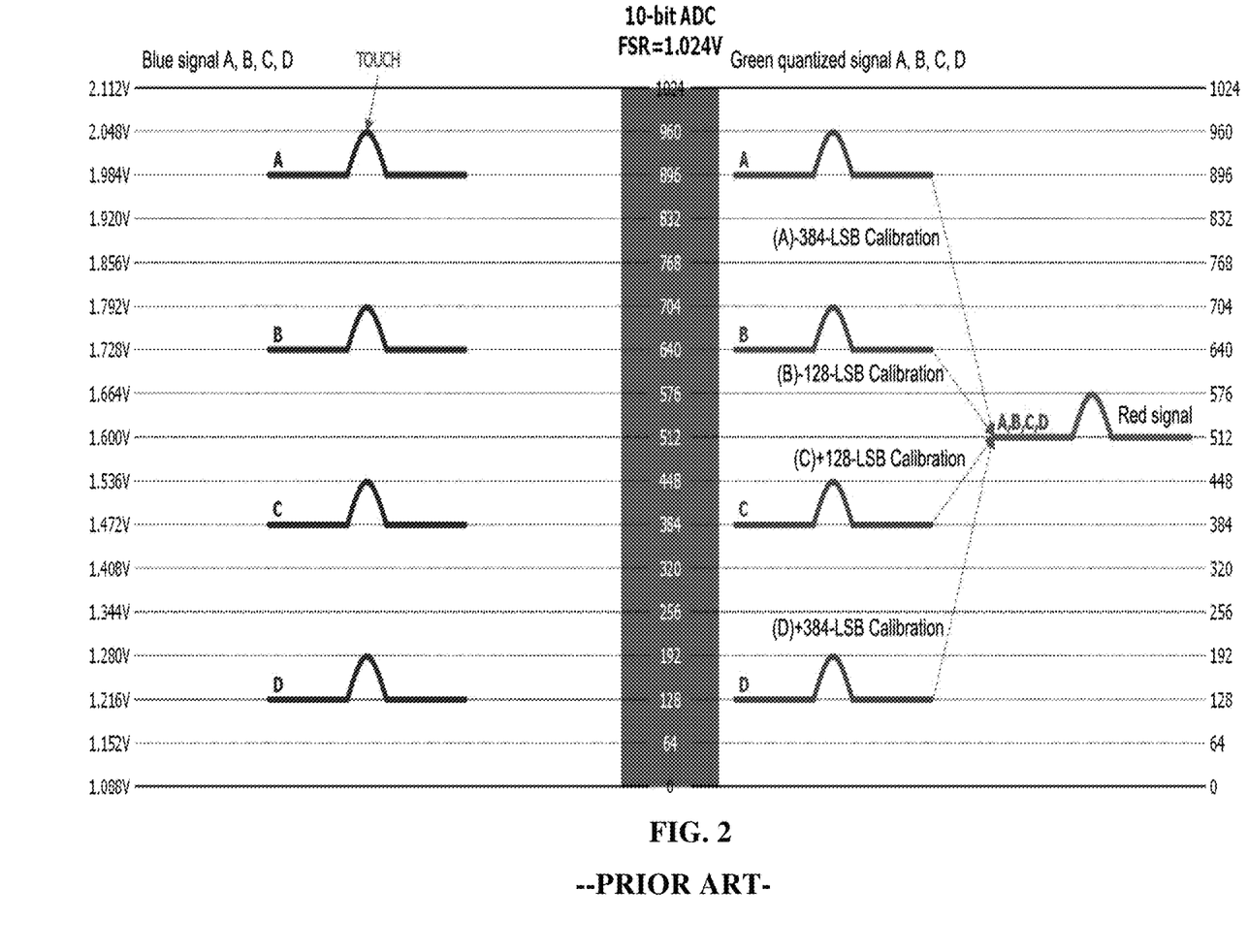
FIG. 2 is a diagram for describing deviation calibration.

FIG. 2 is a diagram for describing the above-described deviation calibration. Four blue signals A, B, C, and D are analog signals generated by detecting touch at four different locations. When these signals are digitized without calibration, four green quantized signals A, B, C, and D are generated, respectively. A reference line on which the signals swing is converted to correspond to voltages at which the original analog signals swing.

Calibration is necessary for swinging based on a code 512 such as a red signal so that the same analysis criterion as touch detection therefor is applied to detect touch and maximum amplitude may swing without clipping.

SUMMARY OF THE INVENTION

To improve sensitivity of touch detection, an input signal is amplified by an amplifier having high gain in some cases. However, a quantization error occurring in a process of quantizing a touch signal is also amplified by the gain. That is, when a system having high gain is used during calibration, calibration on a per-1-LSB basis is not performed, and thus it is necessary to perform calibration on a per-1-LSB basis. Furthermore, in such a case, it is necessary to minimize an increase in die area for forming the system.

The technical problems to be solved by the present invention are not limited to the technical problems mentioned above, and other technical problems not mentioned herein may be clearly understood by a person having ordinary skill in the art from the description of the present invention.

In accordance with an aspect of the present invention, the above and other objects can be accomplished by the provision of a touch signal detection apparatus configured to calibrate an error of a touch signal, the touch signal detection apparatus including a first digital-to-analog converter (DAC) configured to provide a first calibration voltage, a second DAC configured to provide a second calibration voltage, an attenuator configured to attenuate the second calibration voltage and provide the attenuated calibration voltage, an adder configured to add the first calibration voltage and the attenuated calibration voltage, a calibration amplifier configured to amplify a difference between a touch signal generated by detecting touch input and output of the adder with gain greater than 1 and output the difference, a sample-hold unit configured to sample and hold output of the calibration amplifier, and an analog-to-digital converter (ADC) configured to convert output of the sample-hold unit into a digital code.

According to an aspect of the present invention, an input/output relationship of the touch signal detection apparatus may correspond to a formula $$Vout = A\left(Vs - \left(V_{DAC1} + \frac{V_{DAC2}}{A}\right)\right),$$

where $V_{OUT}$ denotes output of the ADC, Vs denotes a touch signal, $V_{DAC1}$ denotes a first calibration voltage, $V_{DAC2}$ denotes a second calibration voltage, and A denotes gain of the calibration amplifier.

According to an aspect of the present invention, the touch signal detection apparatus may further include an operation unit configured to provide a first calibration code corresponding to the first calibration voltage to the first DAC, and provide a second calibration code corresponding to the second calibration voltage to the second DAC.

According to an aspect of the present invention, the operation unit of the touch signal detection apparatus may provide, as the first calibration code, a quotient of a value obtained by dividing a difference between a target reference line and a reference line of a signal quantized without calibrating the touch signal by a product of a ratio of ADC bit resolution to bit resolutions of the first DAC and the second DAC and gain of the calibration amplifier, and provide a remainder of the divided value as the second calibration code.

According to an aspect of the present invention, the operation unit of the touch signal detection apparatus may calculate a formula $$\frac{\text{Target} - \text{Signal}_{w/o\,cal}}{A \times \left(\frac{Res_{ADC}}{Res_{DAC}}\right)} = n + \alpha,$$

and provide n and α as the first calibration code and the second calibration code, respectively, where Target denotes a target reference line, $\text{Signal}_{w/ocal}$ denotes a reference line of a signal quantized without calibrating the touch signal, A denotes gain of the first amplifier, $Res_{ADC}$ denotes bit resolution of the ADC, $Res_{DAC}$ denotes bit resolution of a DAC, n denotes a quotient, and a denotes a remainder.

According to an aspect of the present invention, the operation unit of the touch signal detection apparatus may provide, as the first calibration code, a quotient of a value obtained by dividing a difference between a target reference line and a reference line of a signal quantized by amplifying the touch signal using gain 1 by a ratio of bit resolution of the ADC to the bit resolutions of the first DAC and the second DAC, and provide a remainder of the divided value as the second calibration code.

According to an aspect of the present invention, the operation unit of the touch signal detection apparatus may calculate a formula $$\frac{\text{Target} - \text{Signal}}{1 \times \left(\frac{Res_{ADC}}{Res_{DAC}}\right)} = n + \alpha,$$

and provide n and α as the first calibration code and the second calibration code, respectively, where Target denotes a target reference line, Signal denotes a reference line of a signal quantized by amplifying the touch signal using gain 1, $Res_{ADC}$ denotes bit resolution of an ADC, $Res_{DAC}$ denotes the bit resolutions of the first and second DACs, n denotes a quotient, and α denotes a remainder.

According to an aspect of the present invention, the operation unit may provide, as the first calibration code, a quotient of a value obtained by dividing a difference between a target reference line for an intermediate signal formed by providing the first calibration code and the second calibration code and a reference line of the intermediate signal by a product of a ratio of the bit resolution of the ADC to bit resolutions of the first DAC and the second DAC and gain of the calibration amplifier to the first DAC, and provide a remainder of the divided value to the second DAC as the second calibration code.

According to an aspect of the present invention, the operation unit may calculate a formula $$\frac{\text{Target} - \text{Signal}_m}{A \times \left(\frac{Res_{ADC}}{Res_{DAC}}\right)} = m + \beta,$$

and provide m and β as a third calibration code of the first DAC and a fourth calibration code of the second DAC, respectively, where Target denotes a target reference line, $\text{Signal}_m$ denotes a reference line at which an intermediate signal swings, $Res_{ADC}$ denotes the bit resolution of the ADC, $RES_{DAC}$ denotes the bit resolutions of the first and second DACs, A denotes gain of the first amplifier, m denotes a quotient, and β denotes a remainder.

According to an aspect of the present invention, gain of the sample-hold unit may be 1.

According to an aspect of the present invention, an attenuation ratio of the attenuator and gain of the calibration amplifier may be the same.

According to an aspect of the present invention, bit resolution of the ADC may be greater than bit resolution of the first DAC and bit resolution of the second DAC.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Hereinafter, preferred embodiments of the present invention will be described in detail with reference to the attached drawings. Prior thereto, terms or words used in this specification and claims should not be construed as limited to usual or dictionary meanings, and should be interpreted as having meanings and concepts consistent with the technical idea of the present invention based on the principle that an inventor may appropriately conceptually define a term to describe the invention of the inventor in the best way possible. Therefore, the embodiments described in this specification and the configurations shown in the drawings are only one of the most preferred embodiments of the present invention and do not represent the entire technical idea of the present invention. Thus, it should be understood that, at the time of filing this application, there may be various equivalents and modifications that can replace the embodiments and configurations.

Figure 3:
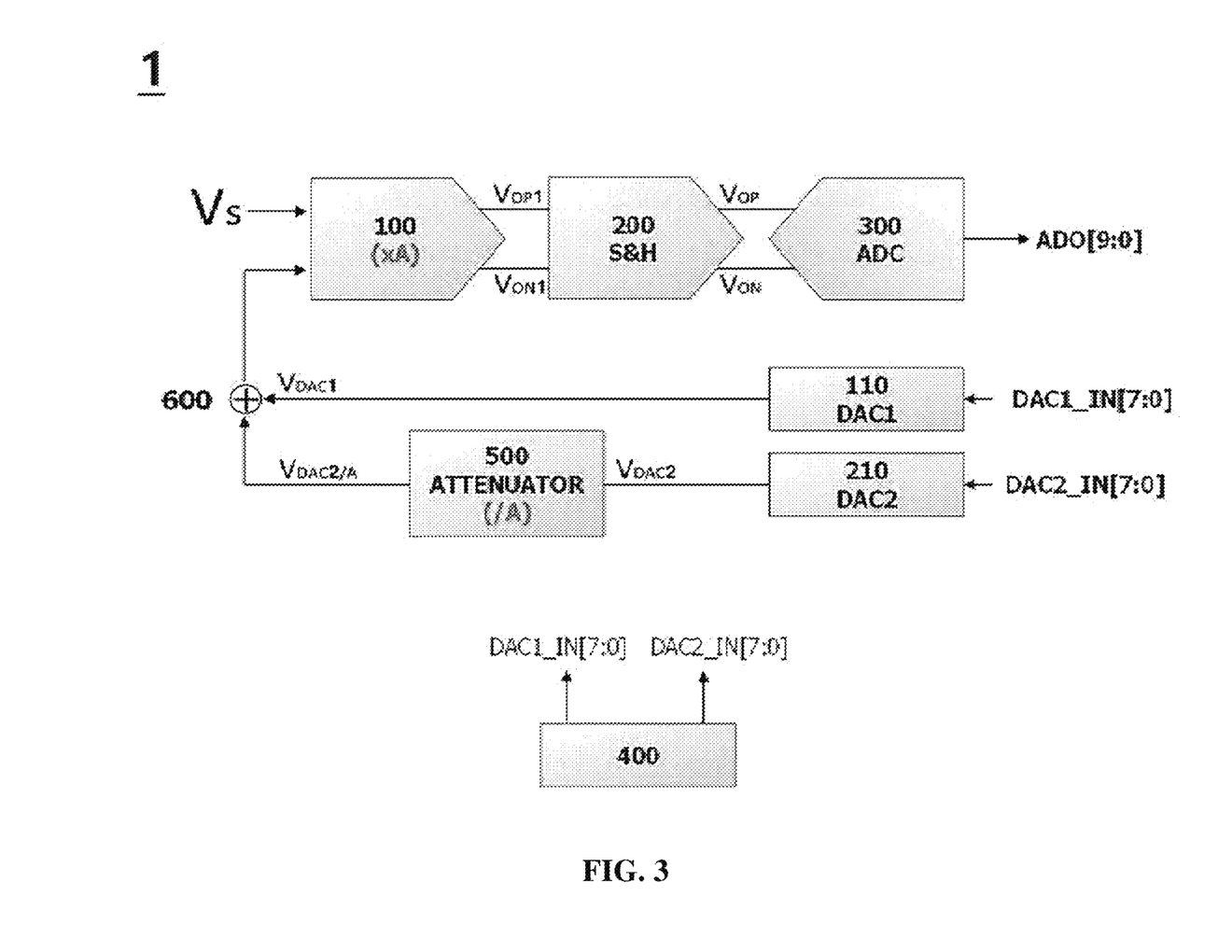
FIG. 3 is a schematic diagram illustrating a touch signal detection circuit according to the present embodiment.

FIG. 3 is a schematic diagram illustrating a touch signal detection circuit 1 according to the present embodiment. Referring to FIG. 3, the present embodiment is a touch signal detection apparatus for calibrating a touch signal with high accuracy, and the touch signal detection apparatus 1 includes a first DAC (digital-to-analog converter) 110 that provides a first calibration voltage $V_{DAC1}$, a second DAC 210 that provides a second calibration voltage $V_{DAC2}$, an attenuator 500 that attenuates the second calibration voltage $V_{DAC2}$ to provide the attenuated calibration voltage $V_{DAC2}/A$, an adder 600 that adds the first calibration voltage $V_{DAC1}$ and the attenuated calibration voltage $V_{DAC2}/A$, a calibration amplifier 100 that amplifies a difference between a touch signal generated by detecting touch input and output of the adder with gain greater than 1 and output the amplified difference, a sample-hold unit 200 that samples and holds output of the calibration amplifier, and an ADC (analog-to-digital converter) 300 that converts output of the sample-hold unit 200 into a digital code. In one embodiment, an attenuation ratio of the attenuator 500 and the gain of the calibration amplifier 100 are the same.

An input/output relationship of the touch signal detection apparatus 1 illustrated in FIG. 3 is as shown in the following formula 1.

[Formula 1]

$$V_{out} = A\left(V_S - \left(V_{DAC1} + \frac{V_{DAC2}}{A}\right)\right)$$

$V_{OUT}$: output signal, $V_S$: touch signal, $V_{DAC1}$: first calibration voltage, $V_{DAC2}$: second calibration voltage, A: gain of calibration amplifier and attenuation ratio of attenuator In the illustrated embodiment, the first DAC 110 receives a first calibration code DAC1_IN from an operation unit 400 and provides the first calibration voltage $V_{DAC1}$, and the second DAC 210 receives a second calibration code DAC2_IN from the operation unit 400 and outputs the second calibration voltage $V_{DAC2}$.

An FSR (full scale range) of the first DAC 110 corresponds to an FSR of the ADC 300, and the first DAC 110 has a resolution of 8 bits. Therefore, a change in analog voltage corresponding to 1-bit change of LSB of the first calibration code DAC1_IN provided to the first DAC 110 corresponds to four times a change in analog voltage corresponding to 1-bit change of LSB of the ADC 300. In addition, the FSR of the second DAC 210 corresponds to ¼ of the FSR of the ADC 300, and the first DAC 110 has a resolution of 8 bits. Therefore, a change in analog voltage corresponding to 1-bit change of LSB of the second DAC 210 corresponds to a change in analog voltage corresponding to 1-bit change of LSB of the ADC 300.

In addition, when LSB of the first calibration code DAC1_IN is changed by 1 bit, $\Delta V_{OUT}$, which is change of output $V_{OUT}$, is expressed as in (1) of Formula 2 below. When LSB of the second calibration code DAC2_IN is changed by 1 bit, $\Delta V_{OUT}$, which is change of output $V_{OUT}$, is expressed as in (2) of Formula 2 below.

[Formula 2]

$$\Delta V_{OUT} = A \times V_{DAC1\_LSB} \quad (1)$$

$$\Delta V_{OUT} = A \times \frac{V_{DAC2\_LSB}}{A} \quad (2)$$

In other words, wide-range calibration is possible using the first calibration code DAC1_IN provided to the first DAC, and precise calibration in units of 1 LSB is possible using the second calibration code DAC2_IN provided to the second DAC.

Hereinafter, it is assumed that the FSR of the first DAC 210 and the ADC 300 is 1.024 V. The resolution of the ADC 300 is 10 bits, and the bit resolutions of the first DAC 110 and the second DAC 210 are 8 bits, which are the same.

In a first embodiment described below, the gain A of the calibration amplifier 100 is set to 4, and the gain of the sample-hold unit 200 is set to 1.

Figure 4:
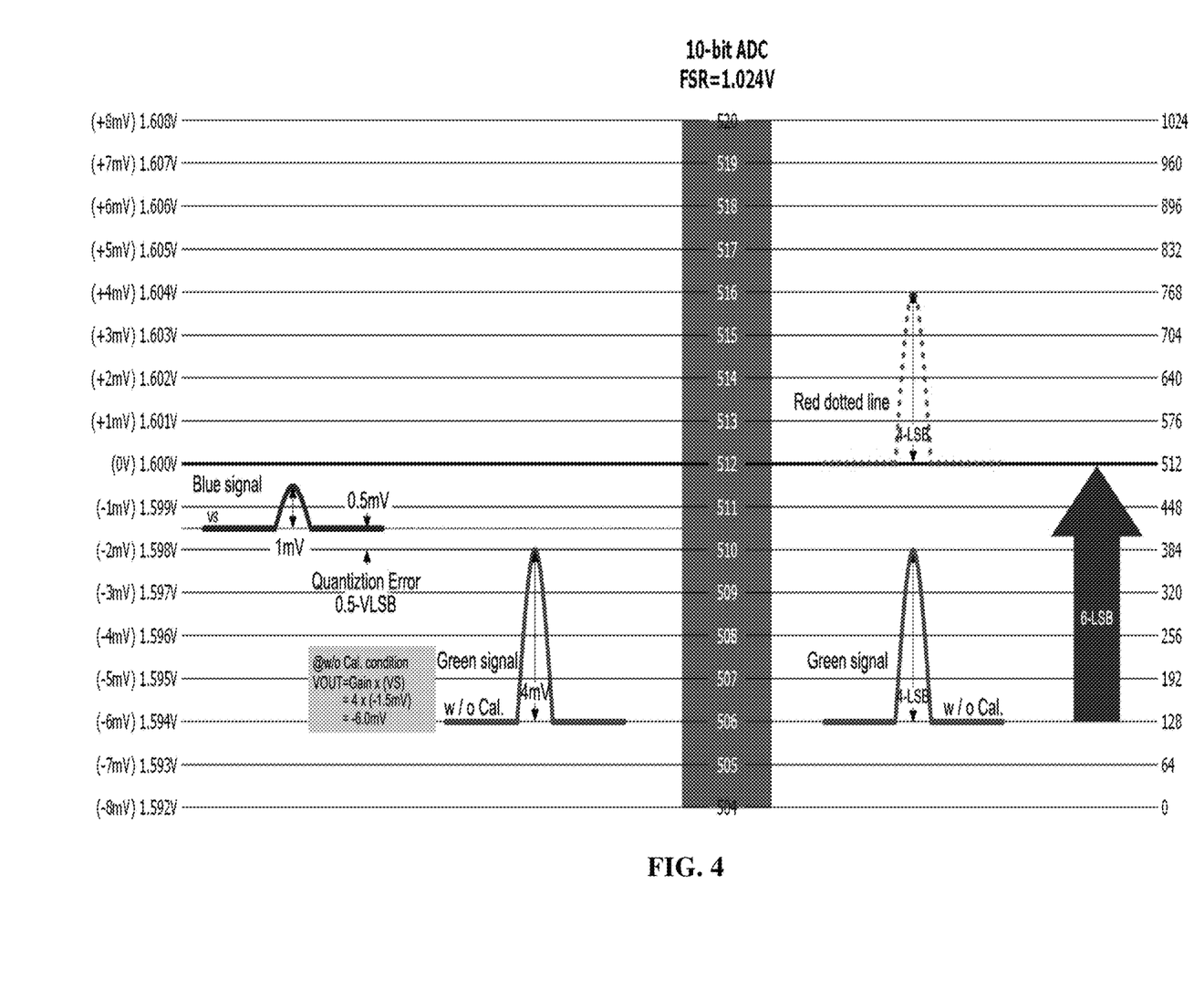
FIG. 4 is a diagram illustrating a touch signal, a green touch signal amplified using gain greater than 1 but not calibrated, and a calibration target of a red dotted line.
Figure 5:
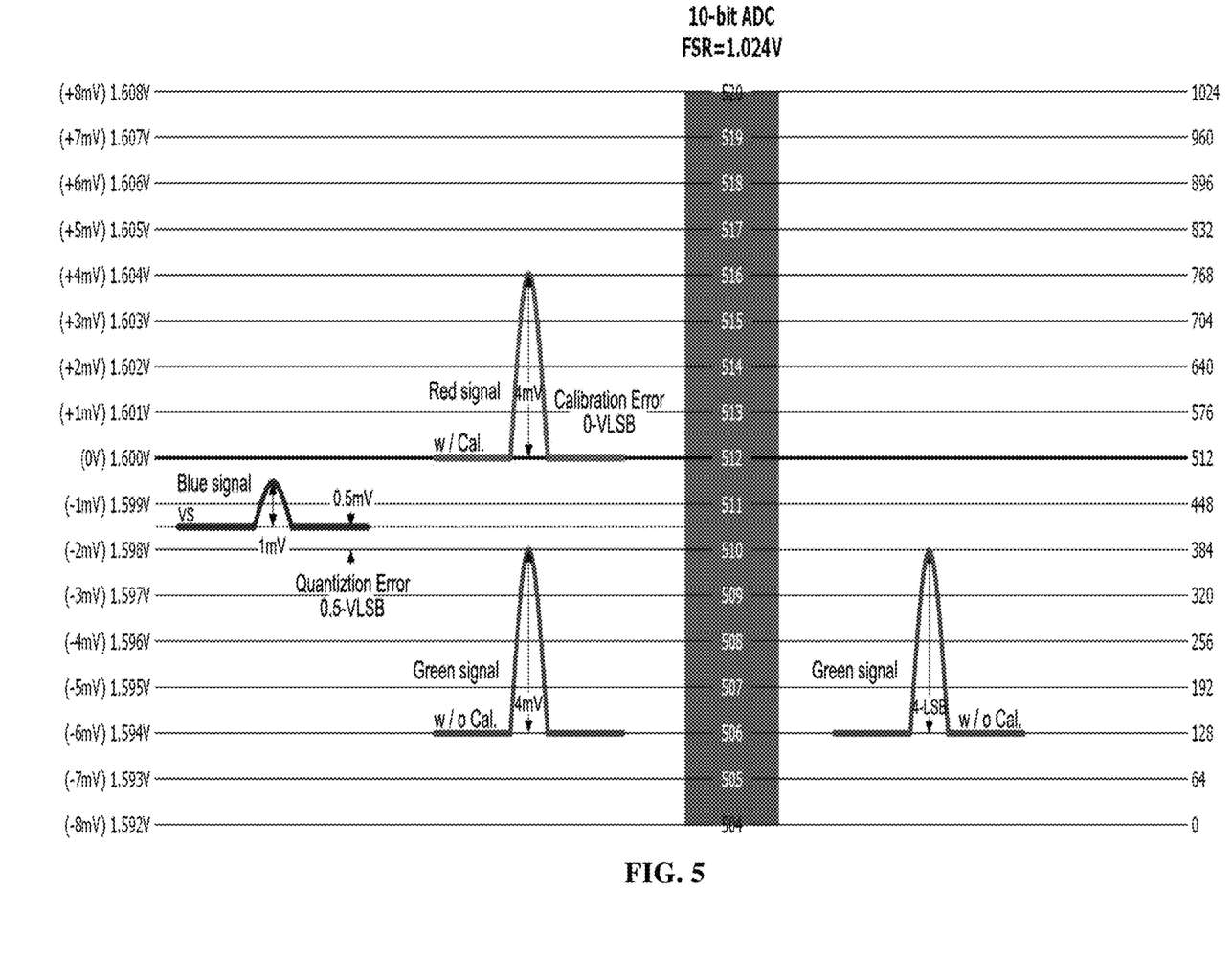
FIG. 5 is a diagram illustrating a process of performing calibration using a touch signal and an uncalibrated touch signal.
Figure 6:
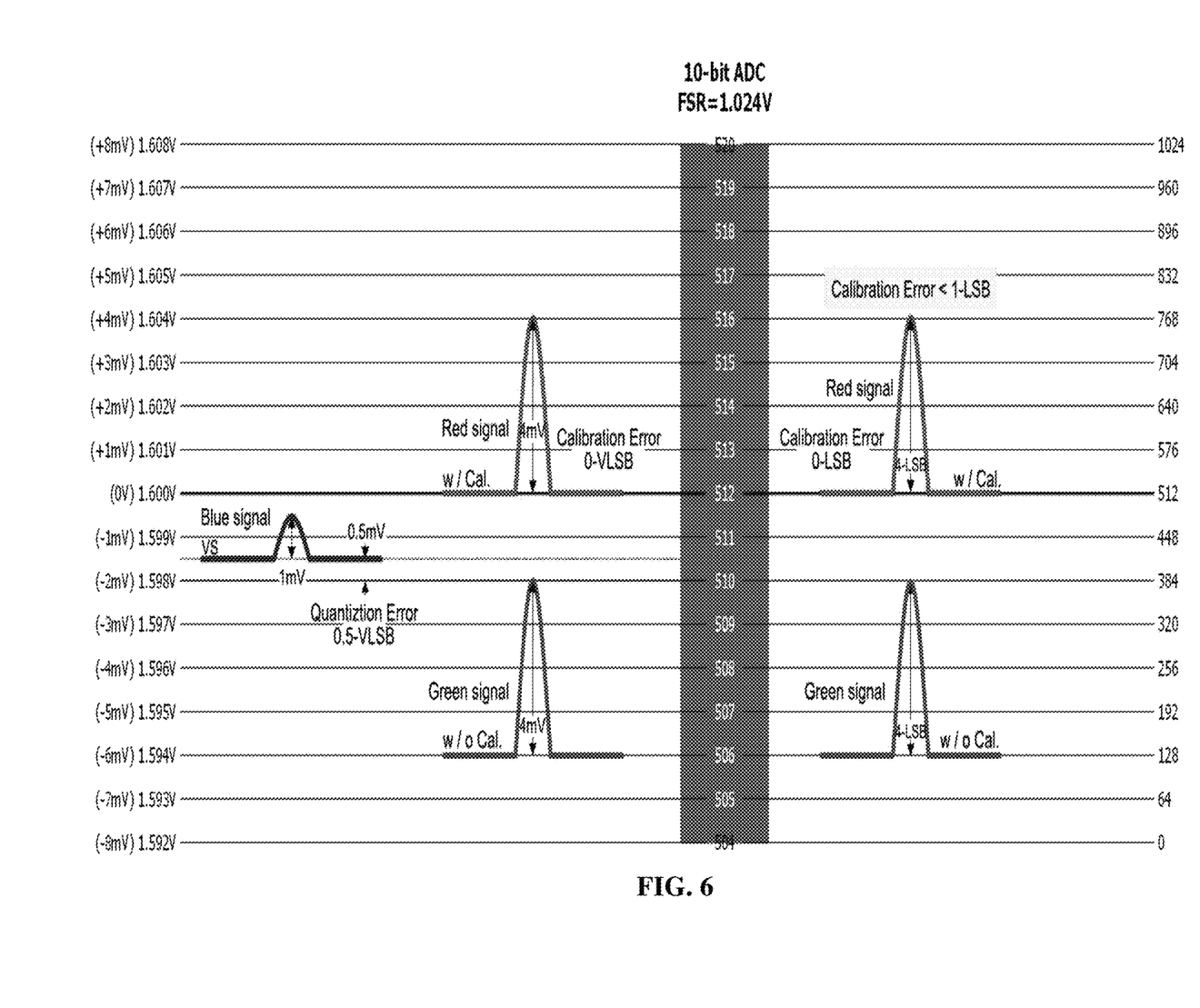
FIG. 6 is a diagram illustrating a touch signal that is amplified using gain greater than 1 and calibrated.

FIGS. 4 to 6 are drawings schematically describing a process of removing a calibration error according to the present embodiment. FIG. 4 is a diagram illustrating a touch signal, a green touch signal that has been amplified using gain greater than 1 but has not been calibrated, and a red dotted line indicating a calibration target. Referring to FIGS. 3 to 4, a user provides touch input by touching each sensor of a touch panel P using an object such as a finger. A reference line at which touch signal Vs corresponding to the touch input swings is different depending on the location where the user provides the touch input. The example illustrates approximately −1.5 mV. However, since a difference of 1 LSB in a digital code represents an analog voltage difference of $1.024 \text{ V}/2^{10}=1$ mV, when the touch signal Vs is quantized, 0.5 mV is not accurately quantized, forming a quantization error.

When the touch signal Vs is provided to the calibration amplifier 100, if the touch signal Vs is amplified with the gain of the calibration amplifier 100 without calibration, 1 mV, which is the amplitude of the touch signal Vs, is amplified to 4 mV, which is four times 1 mV, according to the gain as indicated by a green line, and the touch signal Vs swings with a reference line −6 mV obtained by multiplying −1.5 mV by the gain 4. When this is digitized, it can be seen that the reference line of the touch signal is converted into a digital code 506 corresponding to −6 mV.

However, in order to process touch signals formed in various areas of the touch panel using the same reference and ensure swings of the same amplitude up and down, it is necessary to convert the reference line into a digital code 512 corresponding to 0 V. The operation unit 400 calculates Formula 3 below to form the first calibration code DAC1_IN to be provided to the first DAC 110 and the second calibration code DAC2_IN to be provided to the second DAC 210.

[Formula 3]

$$\frac{\text{Target} - \text{Signal}_{w/o\,cal}}{A \times \left(\frac{Res_{ADC}}{Res_{DAC}}\right)} = \frac{512 - 506}{4 \times 2^2} = \frac{6}{16} = n + \alpha$$

In Formula 3, Target denotes a code value corresponding to a reference line of a calibrated signal, and $\text{Signal}_{w/o\,cal}$ denotes a code value corresponding to a reference line of an uncalibrated signal. A denotes a gain value of the calibration amplifier 100. $Res_{ADC}$ denotes a bit resolution of the ADC. For a 10-bit ADC, the bit resolution $Res_{ADC}=2^{10}=1024$. $Res_{DAC}$ denotes a bit resolution of the DAC. For 1 8-bit DAC, the bit resolution $Res_{DAC}=2^8=256$. n denotes a quotient of a calculation result (n: integer), and α denotes a remainder (0≤α<1). When Formula 1 is calculated according to the example illustrated in FIG. 4, n=0, α=0.375, and 0.375 corresponds to 6 LSB.

FIG. 5 is a diagram illustrating a process of performing calibration using a touch signal and an uncalibrated touch signal. Referring to FIGS. 3 to 5, the operation unit 400 generates a code corresponding to the quotient n of the calculation result and provides the code to the first DAC 110 as the first calibration code DAC1_IN. In addition, the operation unit 400 generates code corresponding to the remainder α of the calculation result and provides the code to the second DAC 210 as the second calibration code DAC2_IN.

The first DAC 110 receives the first calibration code DAC1_IN, and outputs the corresponding first calibration voltage $V_{DAC1}$. In this instance, the first calibration voltage $V_{DAC1}$ is 0 corresponding to 0, which is a quotient (n) value. In addition, the second DAC 210 receives the second calibration code DAC2_IN, and outputs the corresponding second calibration voltage $V_{DAC2}$. In this instance, the second calibration voltage $V_{DAC2}$ is 6 mV corresponding to 0.375, which is a remainder (α) value. An input/output relationship is calculated therefrom as Formula 4.

[Formula 4]

$$\begin{aligned} Vout &= A \times \left( V_S - \left( V_{DAC1} + \frac{V_{DAC2}}{A} \right) \right) \\ &= 4 \times \left( -1.5 \text{ mV} + \left( 0 + \frac{6 \text{ mV}}{4} \right) \right) \\ &= 0 \end{aligned}$$

FIG. 6 is a diagram illustrating a touch signal that is amplified using gain greater than 1 and calibrated. As illustrated in FIG. 6, it can be seen that the quantization error amplified by the gain of the calibration amplifier is eliminated, so that the calibration error is 0.

According to the present embodiment, it can be confirmed that the gain of the calibration amplifier is greater than 1, but the calibration error is lower than 1 LSB.

Figure 7:
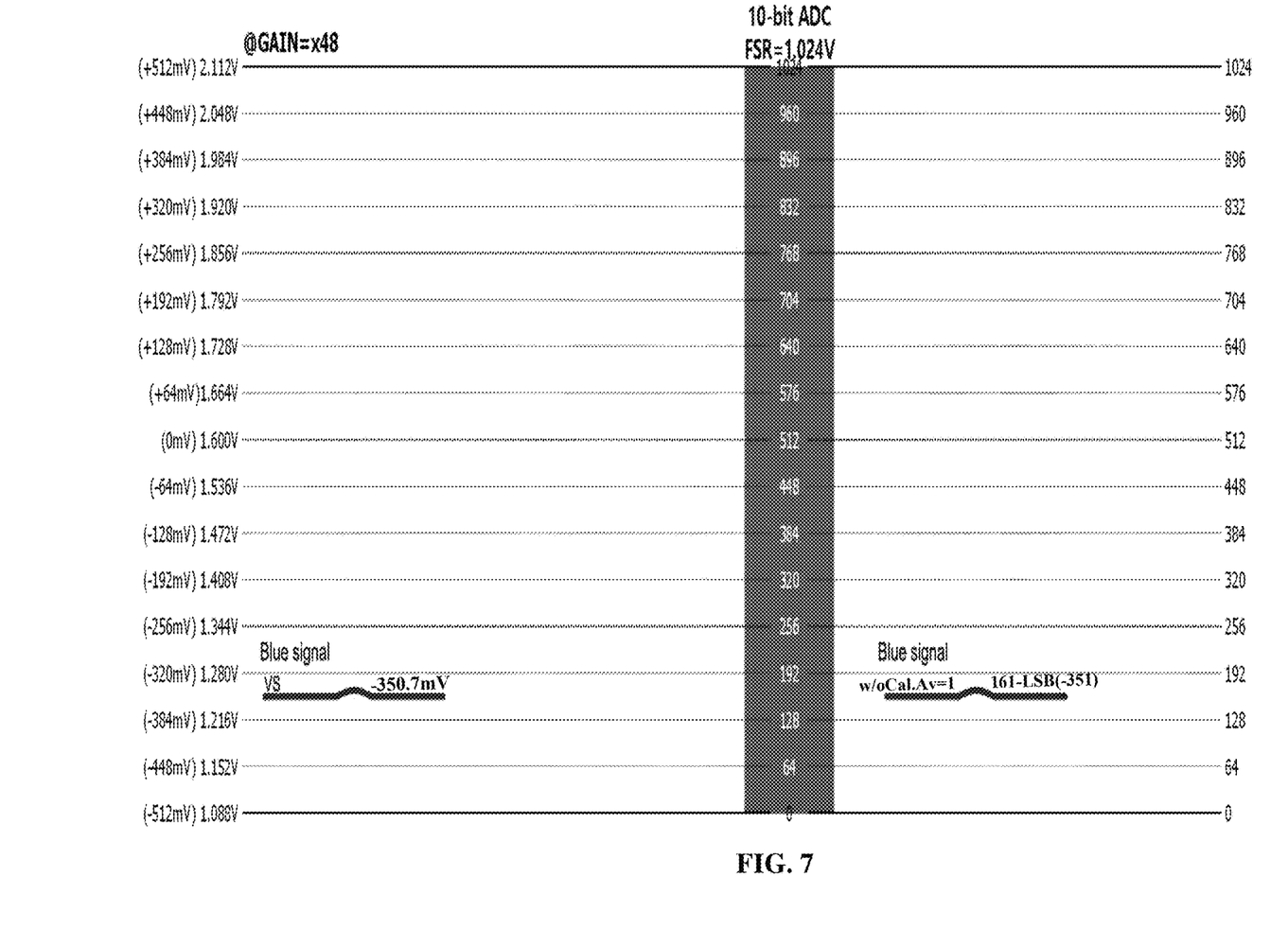
FIG. 7 is a diagram illustrating a touch signal and an unamplified touch signal.

Hereinafter, a second embodiment will be described with reference to FIGS. 7 to 9. In the second embodiment, the gain of the calibration amplifier is 48. In the second embodiment, the touch signal Vs swings with −350.7 mV as a reference line. When the gain A of the calibration amplifier 110 and the attenuation ratio of the attenuator 500 are set to 1 for calibration and digitized, the touch signal Vs swings based on a code 161.

In the illustrated state, an initial calibration code is calculated by calculating Formula 5 below. However, Signal of Formula 5 is a reference line at which the touch signal swings in a state in which the touch signal Vs is amplified with the gain 1 without being calibrated. As a result of calculation of Formula 5, n=87 and α=3, and 0.75 corresponds to 3 LSB. The first calibration code DAC1_IN is formed from a quotient of the calculation result and provided to the first DAC 110, and the second calibration code DAC2_IN is formed from a remainder of the calculation result and provided to the second DAC 110.

[Formula 5]

$$\frac{\text{Target} - \text{Signal}}{A \times \left(\frac{Res_{ADC}}{Res_{DAC}}\right)} = \frac{512 - 161}{1 \times 2^2} = \frac{351}{4} = n + \alpha$$

Figure 8:
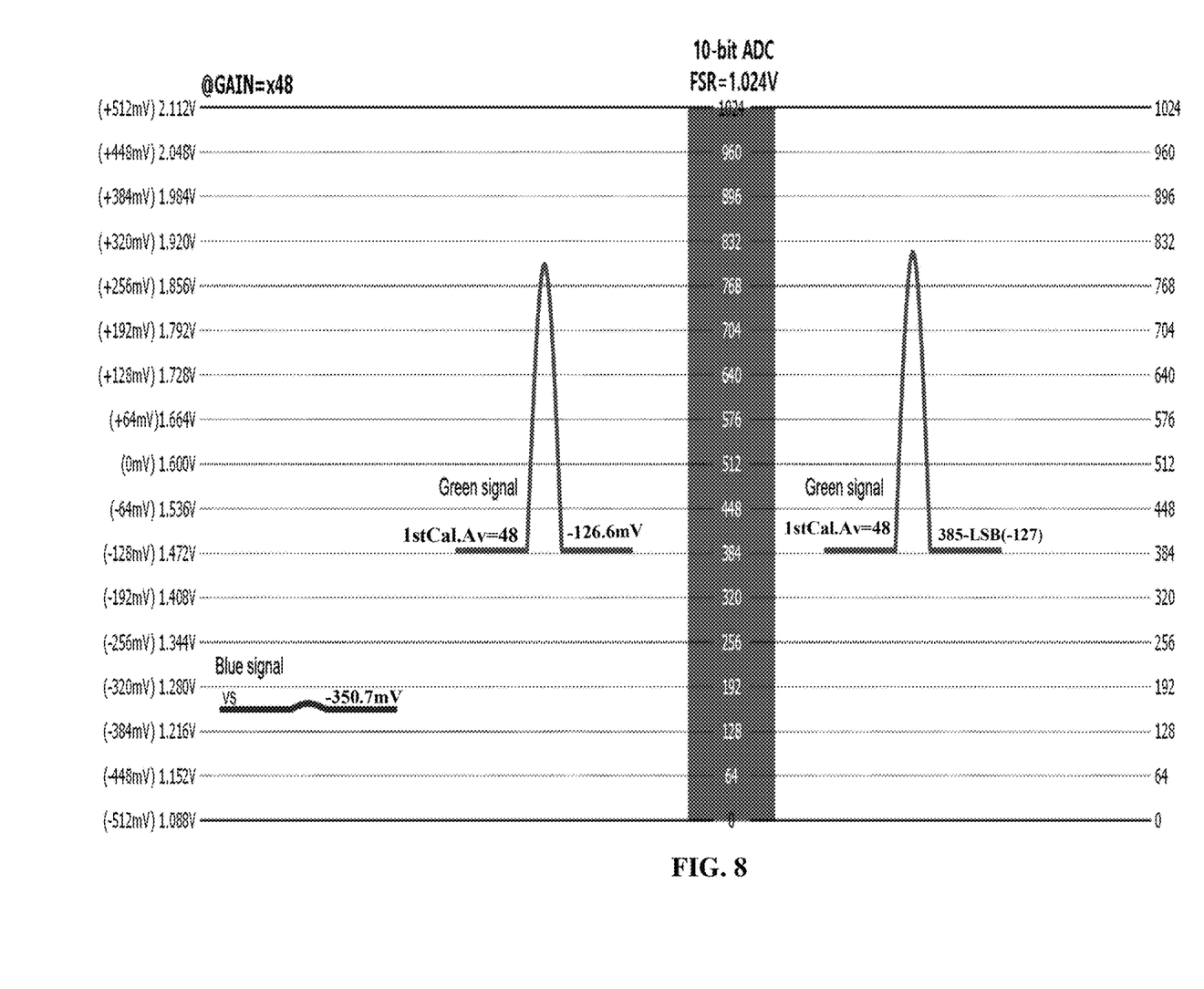
FIG. 8 is a diagram illustrating a green intermediate signal formed by providing a calculated first calibration code and a calculated second calibration code, together with a touch signal.

FIG. 8 is a diagram illustrating a green intermediate signal formed by providing the first calibration code DAC1_IN and the second calibration code DAC2_IN calculated as above, together with the touch signal Vs. Referring to FIG. 8, as described above, the operation unit 400 provides a quotient 87 as the first calibration code DAC1_IN and a remainder 3 LSB as the second calibration code DAC2_IN. The first DAC 110 provided with the first calibration code DAC1_IN outputs the corresponding voltage value, 348 mV, as the first calibration voltage VDAC1, and the second DAC 210 provided with the second calibration code DAC2_IN outputs the corresponding voltage value, 3 mV, as the second calibration voltage VDAC2. In this instance, an output voltage Vout is as shown in the following Formula 6.

[Formula 6]

$$Vout = A \times \left(V_S - \left(V_{DAC1} + \frac{V_{DAC2}}{A}\right)\right)$$
$$= 48 \times \left(-350.7\text{mV} - \left(348\text{mV} + \frac{\text{mV}}{48}\right)\right)$$
$$= -126.6\text{mV}$$

An intermediate signal formed in this manner swings with −126.6 mV as a reference line, and when the intermediate signal is digitized, the intermediate signal swings based on a code 385. In this instance, for calibration, the operation unit 400 calculates the first calibration code DAC1_IN and the second calibration code DAC2_IN by applying 48, which is the gain of the calibration amplifier, as in Formula 7. As a result of calculation, a quotient is 0 and a remainder is 0.6614 . . . , which corresponds to 127 LSB. The operation unit provides the quotient and the remainder calculated in this way as the first calibration code DAC1_IN and the remainder 127 LSB as the second calibration code DAC2_IN.

[Formula 7]

$$\frac{\text{Target} - \text{Signal}}{A \times \left(\frac{Res_{ADC}}{Res_{DAC}}\right)} = \frac{512 - 385}{48 \times 2^2} = \frac{127}{192} = n + \alpha$$

Figure 9:
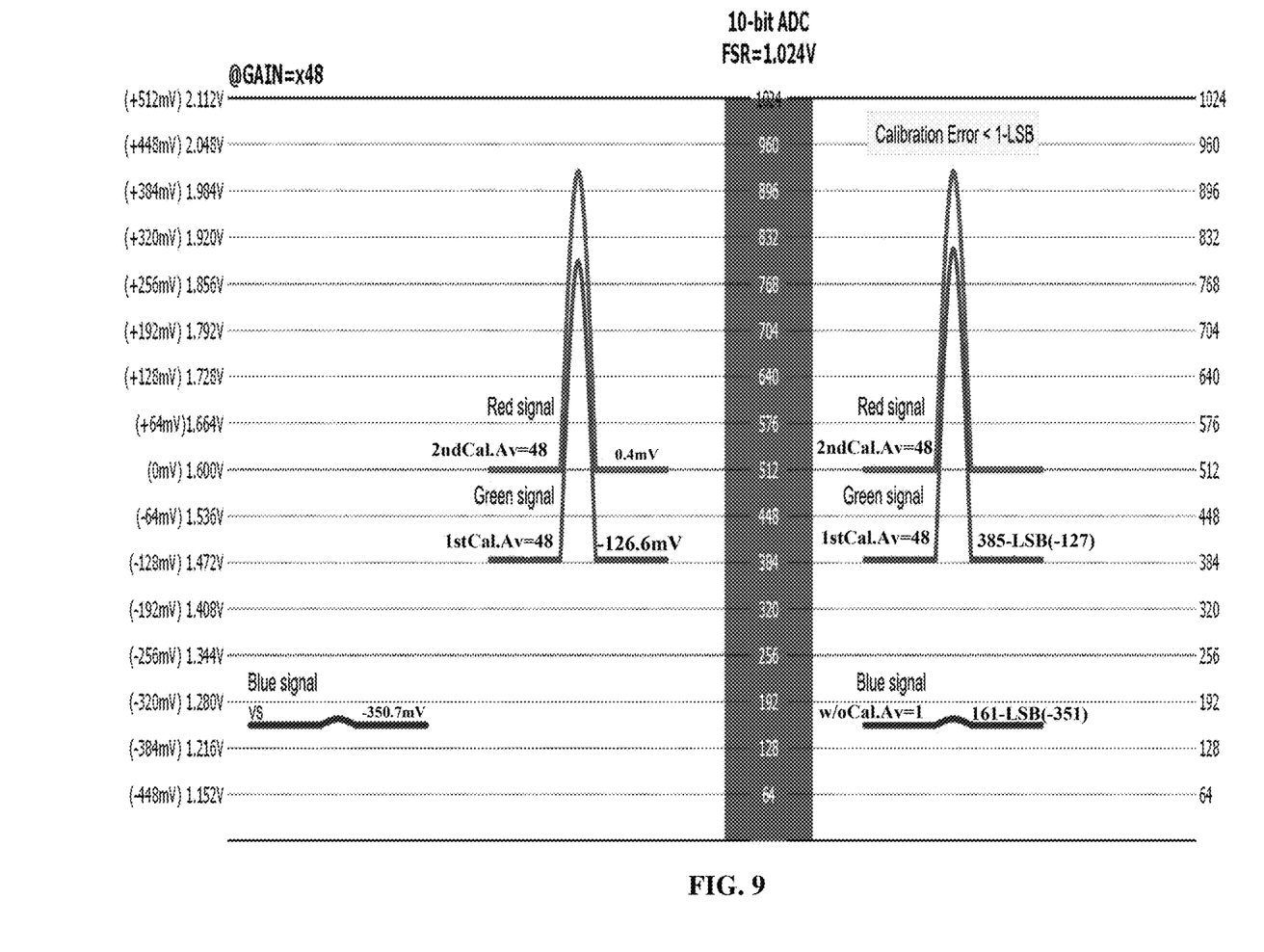
FIG. 9 is a diagram illustrating a calibrated signal according to second calibration.

FIG. 9 is a diagram illustrating a signal calibrated according to second calibration described above. Referring to FIG. 9, the operation unit 400 outputs 0 as the first calibration code DAC1_IN and 127 LSB as the second calibration code DAC2_IN. The first DAC 110 outputs 0 as the first calibration voltage $V_{DAC1}$, and the second DAC 210 outputs 127 mV as the second calibration voltage $V_{DAC2}$. An output signal of the touch signal detection apparatus is calculated therefrom as the following Formula 8.

[Formula 8]

$$Vout = A \times \left(V_S - \left(V_{DAC1} + \frac{V_{DAC2}}{A}\right)\right) =$$
$$48 \times \left(-350.7\text{mV} + 348\text{mV} + \frac{3\text{mV}}{48} + 2.6453\text{mV}\right) = 0.37\text{mV}$$

According to the present embodiment, even when DACs operating at lower resolution than that of ADCs are used, high calibration accuracy may be obtained as described later, and at the same time, the area consumption for forming the same is low, which is an advantage. In addition, the resolutions of the first DAC 110 and the second DAC 210 and the resolution of the ADC 300 are illustrative, and may be easily modified and implemented by those skilled in the art from the present embodiment.

As described above, the present embodiment provides an advantage in that the calibration error may be maintained at 1 LSB or less even when the gain of the calibration amplifier is greater than 1.

As described above, the present embodiment provides an advantage in that the calibration error may be maintained at less than 1 LSB even when the gain of the calibration amplifier is greater than 1.

The effects of the present invention are not limited to those mentioned above, and other tasks not mentioned herein may be clearly understood by those skilled in the art from the above description.

Even though the present invention has been described with respect to specific embodiments of the present invention, these are merely examples and the present invention is not limited thereto. Those skilled in the art to which the present invention pertains may change or modify the described embodiments without departing from the scope of the present invention, and various modifications and variations are possible within the scope of the technical idea of the present invention and the equivalent scope of the patent claims to be described below.

The invention claimed is:

1. A touch signal detection apparatus configured to calibrate an error of a touch signal, the touch signal detection apparatus comprising:
   a first digital-to-analog converter (DAC) configured to provide a first calibration voltage;
   a second DAC configured to provide a second calibration voltage;
   an attenuator configured to attenuate the second calibration voltage and provide the attenuated calibration voltage;

an adder configured to add the first calibration voltage and the attenuated calibration voltage;

a calibration amplifier configured to amplify a difference between a touch signal generated by detecting touch input and output of the adder with gain greater than 1 and output the difference;

a sample-hold unit configured to sample and hold output of the calibration amplifier; and an analog-to-digital converter (ADC) configured to convert output of the sample-hold unit into a digital code.

2. The touch signal detection apparatus according to claim 1, wherein an input/output relationship of the touch signal detection apparatus corresponds to a formula $$Vout = A\left(Vs - \left(V_{DAC1} + \frac{V_{DAC2}}{A}\right)\right),$$

where $V_{OUT}$ denotes output of the ADC, Vs denotes a touch signal, $V_{DAC1}$ denotes a first calibration voltage, $V_{DAC2}$ denotes a second calibration voltage, and A denotes gain of the calibration amplifier.

3. The touch signal detection apparatus according to claim 1, further comprising an operation unit configured to provide a first calibration code corresponding to the first calibration voltage to the first DAC, and provide a second calibration code corresponding to the second calibration voltage to the second DAC.

4. The touch signal detection apparatus according to claim 3, wherein the operation unit of the touch signal detection apparatus provides, as the first calibration code, a quotient of a value obtained by dividing a difference between a target reference line and a reference line of a signal quantized without calibrating the touch signal by a product of a ratio of ADC bit resolution to bit resolutions of the first DAC and the second DAC and gain of the calibration amplifier, and provides a remainder of the divided value as the second calibration code.

5. The touch signal detection apparatus according to claim 3, wherein the operation unit of the touch signal detection apparatus calculates a formula $$\frac{\text{Target} - \text{Signal}_{w/o\,cal}}{A \times \left(\frac{Res_{ADC}}{Res_{DAC}}\right)} = n + \alpha,$$

and provides n and α as the first calibration code and the second calibration code, respectively, where Target denotes a target reference line, $\text{Signal}_{w/ocal}$ denotes a reference line of a signal quantized without calibrating the touch signal, A denotes gain of the first amplifier, $Res_{ADC}$ denotes bit resolution of the ADC, $Res_{DAC}$ denotes bit resolution of a DAC, n denotes a quotient, and α denotes a remainder.

6. The touch signal detection apparatus according to claim 3, wherein the operation unit of the touch signal detection apparatus provides, as the first calibration code, a quotient of a value obtained by dividing a difference between a target reference line and a reference line of a signal quantized by amplifying the touch signal using gain 1 by a ratio of bit resolution of the ADC to the bit resolutions of the first DAC and the second DAC, and provides a remainder of the divided value as the second calibration code.

7. The touch signal detection apparatus according to claim 3, wherein the operation unit of the touch signal detection apparatus calculates a formula $$\frac{\text{Target} - \text{Signal}}{1 \times \left(\frac{Res_{ADC}}{Res_{DAC}}\right)} = n + \alpha,$$

and provides n and α as the first calibration code and the second calibration code, respectively, where Target denotes a target reference line, Signal denotes a reference line of a signal quantized by amplifying the touch signal using gain 1, $Res_{ADC}$ denotes bit resolution of an ADC, $Res_{DAC}$ denotes the bit resolutions of the first and second DACs, n denotes a quotient, and α denotes a remainder.

8. The touch signal detection apparatus according to claim 6, wherein the operation unit provides, as the first calibration code, a quotient of a value obtained by dividing a difference between a target reference line for an intermediate signal formed by providing the first calibration code and the second calibration code and a reference line of the intermediate signal by a product of a ratio of the bit resolution of the ADC to bit resolutions of the first DAC and the second DAC and gain of the calibration amplifier to the first DAC, and provides a remainder of the divided value to the second DAC as the second calibration code.

9. The touch signal detection apparatus according to claim 7, wherein the operation unit calculates a formula $$\frac{\text{Target} - \text{Signal}_m}{A \times \left(\frac{Res_{ADC}}{Res_{DAC}}\right)} = m + \beta,$$

and provides m and β as a third calibration code of the first DAC and a fourth calibration code of the second DAC, respectively, where Target denotes a target reference line, $\text{Signal}_m$ denotes a reference line at which an intermediate signal swings, $Res_{ADC}$ denotes the bit resolution of the ADC, $Res_{DAC}$ denotes the bit resolutions of the first and second DACs, A denotes gain of the first amplifier, m denotes a quotient, and β denotes a remainder.

10. The touch signal detection apparatus according to claim 1, wherein gain of the sample-hold unit is 1.

11. The touch signal detection apparatus according to claim 1, wherein an attenuation ratio of the attenuator and gain of the calibration amplifier are the same.

12. The touch signal detection apparatus according to claim 1, wherein bit resolution of the ADC is greater than bit resolution of the first DAC and bit resolution of the second DAC.

* * * * *